(12) United States Patent
Kobayashi et al.

(10) Patent No.: US 9,881,243 B2
(45) Date of Patent: Jan. 30, 2018

(54) IMAGE FORMING APPARATUS HAVING DEPLOYMENT CONFIGURATIONS

(71) Applicant: FUJI XEROX CO., LTD., Tokyo (JP)

(72) Inventors: Kazuhide Kobayashi, Kanagawa (JP); Keiji Ishiguro, Kanagawa (JP); Masashi Murakami, Kanagawa (JP); Atsuo Matsunaga, Kanagawa (JP); Takayuki Matsui, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/370,816

(22) Filed: Dec. 6, 2016

(65) Prior Publication Data

US 2017/0308776 A1 Oct. 26, 2017

(30) Foreign Application Priority Data

Apr. 26, 2016 (JP) ................................. 2016-087584

(51) Int. Cl.
*G06K 15/00* (2006.01)
*G06K 15/02* (2006.01)

(52) U.S. Cl.
CPC ....... *G06K 15/4065* (2013.01); *G06K 15/022* (2013.01); *G06K 15/1805* (2013.01); *G06K 15/408* (2013.01)

(58) Field of Classification Search
None
See application file for complete search history.

(56) References Cited

U.S. PATENT DOCUMENTS

| 7,644,145 | B2 * | 1/2010 | Rockwell | G06Q 10/0875 |
| | | | | 358/1.15 |
| 8,139,238 | B2 * | 3/2012 | Oki | B41J 11/485 |
| | | | | 271/9.01 |
| 2009/0015865 | A1 * | 1/2009 | Tao | G06F 3/1208 |
| | | | | 358/1.15 |
| 2009/0161149 | A1 * | 6/2009 | Noguchi | H04N 1/00334 |
| | | | | 358/1.15 |

(Continued)

FOREIGN PATENT DOCUMENTS

JP 2004351830 A 12/2004
JP 2007052104 A 3/2007

*Primary Examiner* — Ming Hon
(74) *Attorney, Agent, or Firm* — Oliff PLC

(57) ABSTRACT

An image forming apparatus includes an operation unit that receives an instruction for an operation and executes the operation, and an instruction unit that outputs the instruction to the operation unit. The operation unit includes a configuration storage unit that stores deployment configuration of one or more image forming apparatuses, and an instruction acceptance unit that accepts an instruction for an operation corresponding to the deployment configuration. The instruction unit includes an instruction output unit that receives a designation of an operation, and outputs an instruction for the designated operation to the operation unit, and a configuration reporting unit that, if the designated operation does not correspond to a first deployment configuration stored in the configuration storage unit, reports to the operation unit a second deployment configuration to which the designated operation corresponds, and stores the second deployment configuration in the configuration storage unit, before the instruction is output.

6 Claims, 4 Drawing Sheets

(56) References Cited

U.S. PATENT DOCUMENTS

2010/0220350 A1* 9/2010 Faridi .................. H04L 41/026
                                                    358/1.15
2015/0212926 A1* 7/2015 Maeda ................ G06F 11/3664
                                                    714/38.1

* cited by examiner

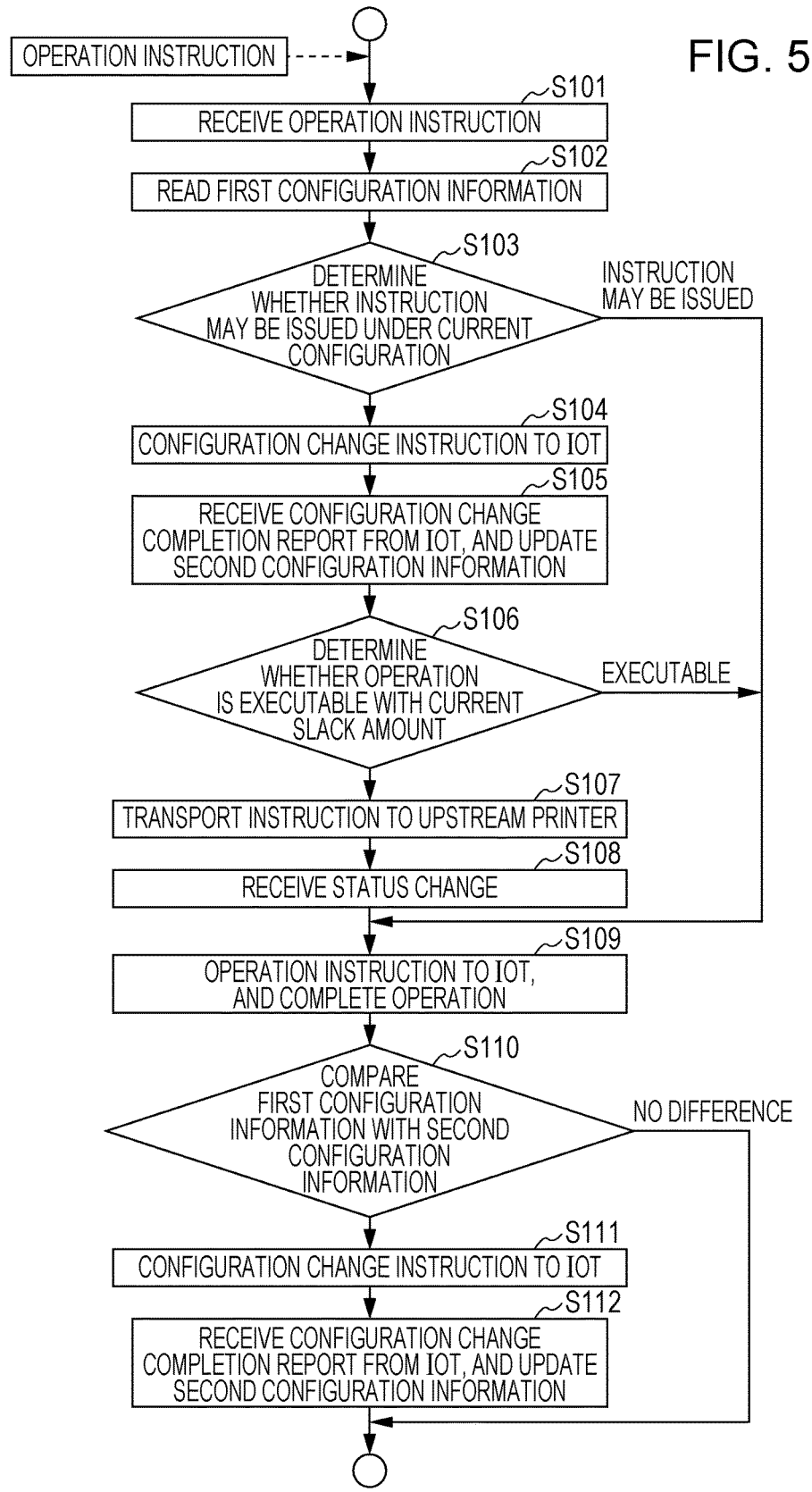

IMAGE FORMING APPARATUS HAVING DEPLOYMENT CONFIGURATIONS

CROSS-REFERENCE TO RELATED APPLICATIONS

This application is based on and claims priority under 35 USC 119 from Japanese Patent Application No. 2016-087584 filed Apr. 26, 2016.

BACKGROUND

(i) Technical Field

The present invention relates to an image forming apparatus.

(ii) Related Art

Conventionally, as an image forming system that forms an image on so-called continuous paper used as a type of recording medium, there is known an image forming system that changes the arrangement configuration of image forming apparatuses of a single-sided printing type so as to support plural system configurations such as those for single-sided printing and double-sided printing.

An image forming apparatus used in such an image forming system needs to provide a function that executes a so-called tandem operation for transporting a sheet of continuous paper and forming an image thereon in cooperation with plural image forming apparatuses. Further, for example, when performing maintenance and inspection, the image forming apparatus also needs to provide a function that executes an independent operation for operating independently of other image forming apparatuses.

SUMMARY

There is a case where an operation unit included in an image forming apparatus and configured to transport a recording medium and form an image thereon is of a type that stores the arrangement configuration of image forming apparatuses in the image forming system, and rejects an instruction by returning an error if the operation indicated by the instruction does not correspond to the arrangement configuration. Then, in the case of causing the image forming apparatus to execute an operation indicated by an instruction that is rejected under the current arrangement configuration in the image forming system as needed for maintenance, inspection, or the like, the operator changes the actual arrangement configuration, changes information on the arrangement configuration, or replaces the operation with an operation that is accepted by the operation unit under the current arrangement configuration. This results in a problem in that the operator needs to perform troublesome work.

This problem is common to image forming systems that support plural system configurations by using one or more image forming apparatuses including an operation unit of a type that rejects an instruction for an operation not corresponding to the arrangement configuration.

According to an aspect of the invention, there is provided an image forming apparatus including: an operation unit that transports recording medium and forms an image on the recording medium, the operation unit receiving an instruction for an operation and executing the operation; and an instruction unit that outputs the instruction for the operation to the operation unit; wherein the operation unit includes a configuration storage unit that stores deployment configuration of one or more image forming apparatuses deployed in an image forming system, and an instruction acceptance unit that, based on a predetermined corresponding relationship between the deployment configuration and operations, accepts an instruction for an operation corresponding to the deployment configuration stored in the configuration storage unit, and rejects an instruction for an operation not corresponding to the deployment configuration; and wherein the instruction unit includes an instruction output unit that receives a designation of an operation to be instructed to the operation unit, and outputs an instruction for the designated operation to the operation unit, and a configuration reporting unit that, if the operation designated for the instruction output unit is an operation not corresponding to a first deployment configuration stored in the configuration storage unit, reports to the operation unit a second deployment configuration to which the designated operation corresponds, and stores the second deployment configuration in the configuration storage unit, before the instruction for the designated operation is output.

BRIEF DESCRIPTION OF THE DRAWINGS

An exemplary embodiment of the present invention will be described in detail based on the following figures, wherein:

FIG. 5 is a flowchart illustrating a function of temporarily rewriting configuration information.

DETAILED DESCRIPTION

Figure 1:
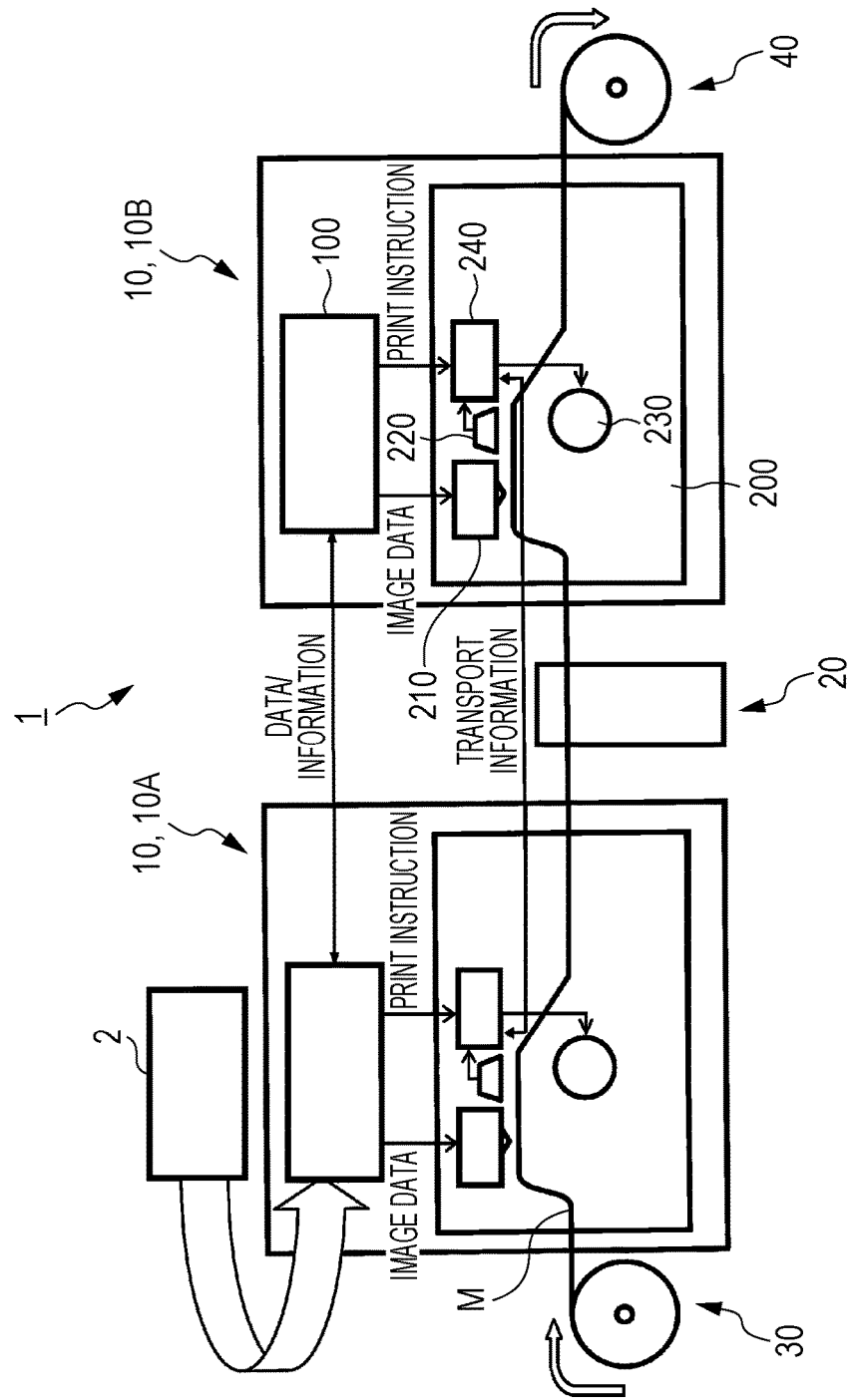
FIG. 1 is a schematic configuration diagram illustrating a printing system including a printer corresponding to an exemplary embodiment of an image forming apparatus of the present invention.

FIG. 1 is a schematic configuration diagram illustrating a printing system including a printer corresponding to an exemplary embodiment of an image forming apparatus of the present invention.

A printing system 1 illustrated in FIG. 1 includes two printers 10 of the same model, a paper reversing buffer device 20, a paper feeding device 30, and a paper collecting device 40. This printing system 1 corresponds to an example of an image forming system of the present invention.

Paper M that is fed from the paper feeding device 30 is so-called continuous paper. The paper M is transported through a transport path that sequentially passes through a first one of the printers 10, the paper reversing buffer device 20, and a second one of the printers 10, and is collected by the paper collecting device 40. In the following description, when the two printers 10 need to be distinguished from each other, the printer 10 located at the upstream side in the transport path of the paper M is referred to as an upstream printer 10A, and the printer 10 located at the downstream side in the transport path of the paper M is referred to as a downstream printer 10B. These two printers 10 have a function of performing an independent operation (single mode), in addition to a function of performing a so-called tandem operation (tandem mode) in such a manner that the two printers 10 are connected to each other as illustrated in FIG. 1.

The paper reversing buffer device 20 reverses the front and back of the paper M between the two printers 10, and guides the paper M while adjusting the tension so as to prevent the paper M from slackening or being torn.

Each printer 10 includes a controller 100 and a printing mechanism unit 200. The printing mechanism unit 200 forms an image on the paper M and transports the paper M. The controller 100 processes image data and manages print jobs. Further, the controller 100 outputs image data to the printing mechanism unit 200, and issues various types of instructions such as a print instruction and a transport instruction to the printing mechanism unit 200. The controller 100 corresponds to an example of an instruction unit of the present invention, and the printing mechanism unit 200 corresponds to an example of an operation unit of the present invention.

The printing mechanism unit 200 includes a printing unit 210, an image reading unit 220, a transport unit 230, and a control unit 240. The printing unit 210 forms an image on the paper M by using a so-called ink-jet system, in accordance with image data provided from the controller 100. Since the paper reversing buffer device 20 reverses the front and back of the paper, the printing unit 210 of the upstream printer 10A forms an image on a first side (front side) of the paper M, and the printing unit 210 of the downstream printer 10B forms an image on a second side (back side) of the paper M. Note that although the printing unit 210 of the ink-jet system is illustrated herein, the image forming apparatus of the present invention may be one that forms an image using a so-called electrophotographic device. Further, the printing unit 210 may be one that forms a color image, or may be one that forms a monochrome image.

The image reading unit 220 reads an image formed by the printing unit 210, and reads a mark of a page that is formed by the upstream printer 10A so as to align the printing positions of the upstream printer 10 and the downstream printer 10. The read results obtained by the image reading unit 220 are input to the control unit 240.

The transport unit 230 includes a transport roller driven by a transport motor, and transports the paper M in accordance with an instruction from the control unit 240.

The printing system 1 causes the upstream printer 10A and the downstream printer 10B to cooperate to execute a printing operation in accordance with image data of a print job transmitted from a host apparatus 2 such as a personal computer. Further, the printing system 1 receives an instruction to execute or stop a print job from the user (operator) via a user interface (UI) (not illustrated), and performs an operation in accordance with the instruction. Further, when performing maintenance and inspection, the printing system 1 receives an instruction to perform an operation different from the operation of a regular print job, from the user (operator) via the UI, and performs the operation in accordance with the instruction.

The controller 100 of the upstream printer 10A receives image data of a print job from the host apparatus 2. Between the upstream printer 10A and downstream printer 10B, the controllers 100 exchange image data and information on a job, and the control units 240 exchange information on the transport amount and so on, in order to cooperatively perform image formation.

In the present exemplary embodiment, since the printers 10 of the same model are used as the upstream printer 10A and the downstream printer 10B, each printer 10 has a simple structure. Further, it is easy to support other configurations such as a system for single-sided printing.

The following describes a configuration focused on the control system of the printing system 1.

Figure 2:
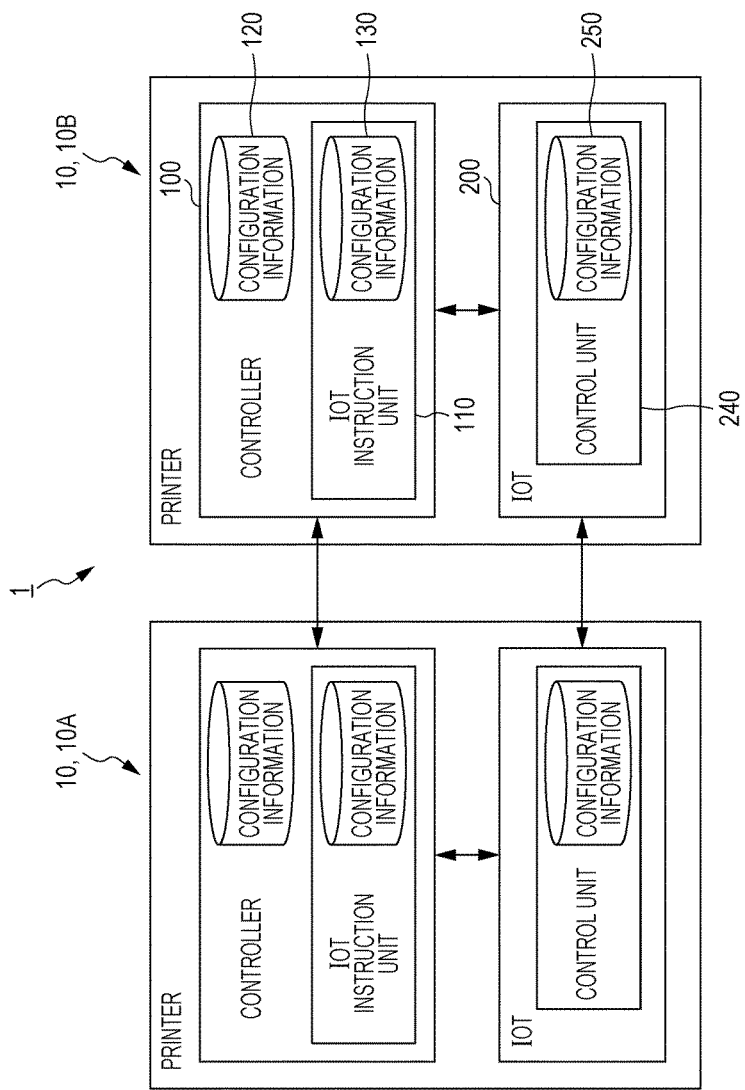
FIG. 2 illustrates the configuration of a control system of the printing system.

FIG. 2 illustrates the configuration of the control system of the printing system 1.

As mentioned above, the printing system 1 includes the upstream printer 10A and the downstream printer 10B, which are the printers 10 of the same model. Each printer 10 includes the controller 100 and the printing mechanism unit 200. The printing mechanism unit 200 includes the control unit 240. Note that the printing mechanism unit 200 is hereinafter also referred to as an image output terminal (IOT).

The controller 100 includes an IOT instruction unit 110 that instructs the printing mechanism unit (IOT) 200 to perform an operation. The IOT instruction unit 110 of the present exemplary embodiment is a part of the controller 100 in terms of function. However, as for the hardware, the IOT instruction unit 110 has a substrate independent from a substrate forming a principal part of the controller 100. The IOT instruction unit 110 receives a designation of an operation to be instructed to the printing mechanism unit 200 from (the principal part) of the controller 100, and outputs an instruction (command) for the designated operation to the printing mechanism unit 200. Further, the controller 100, the IOT instruction unit 110, and the control unit 240 of the printing mechanism unit 200 include configuration storage units 120, 130, and 250, respectively, that store configuration information indicating the deployment configuration of the printers 10 in the printing system 1.

The configuration information stored in the configuration storage unit 120 of the controller 100 indicates the actual deployment configuration in the printing system 1. This deployment configuration is graphically displayed on the UI so as to be checked by the user (operator) of the printing system 1.

The configuration information stored in the configuration storage unit 250 of the control unit 240 of the printing mechanism unit 200 is configuration information reported from the IOT instruction unit 110. In the case where a regular print job is executed, the configuration storage unit 250 of the control unit 240 stores the same configuration information as that stored in the configuration storage unit 120 of the controller 100. The control unit 240 of the printing mechanism unit 200 also stores the corresponding relationship between operations in the printing mechanism unit 200 and the deployment configuration of the printers 10 in the printing system 1. If an instruction (command) output from the IOT instruction unit 110 is an instruction (command) for an operation not corresponding to the deployment configuration indicated by the configuration information stored in the configuration storage unit 250, the control unit 240 returns an error without executing the operation. This mechanism of the printing mechanism unit 200 is a mechanism for prioritizing safety that is incorporated in order to prevent the paper M from being torn due to an erroneously issued instruction for an operation not corresponding to the configuration of the printing system 1.

On the other hand, upon performing maintenance and inspection, there is a need to execute a single-mode operation for maintenance and inspection purposes even though the actual configuration is the tandem configuration illustrated in FIG. 1.

In view of this, a mechanism is devised for the printer 10 of the present exemplary embodiment so as to cause the printing mechanism unit 200 to perform an operation not corresponding to the actual configuration in the printing system 1. That is, a function for temporarily rewriting the configuration information stored in the configuration storage unit 250 of the control unit 240 of the printing mechanism unit 200 is incorporated in the IOT instruction unit 110.

The following provides a detailed description of the configuration information.

Figure 3:
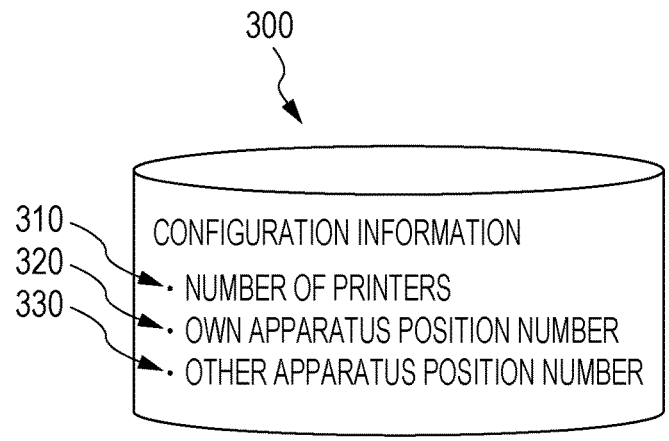
FIG. 3 illustrates the structure of configuration information.

FIG. 3 illustrates the structure of configuration information.

Configuration information 300 includes "the number of printers" 310 indicating how many printers 10 are deployed in the printing system 1, "own apparatus position number" 320 indicating the position where the printer 10 (the own apparatus) storing the configuration information 300 is deployed in the printing system 1, and "other apparatus position number" 330 indicating the position where the printer 10 (the other apparatus) other than the printer 10 storing the configuration information 300 is deployed in the printing system 1.

The configuration information 300 is stored in each of the configuration storage units 120, 130, and 250. Further, two pieces of configuration information, that is, first configuration information and second configuration information are stored in the configuration storage unit 130 of the IOT instruction unit 110.

Figure 4:
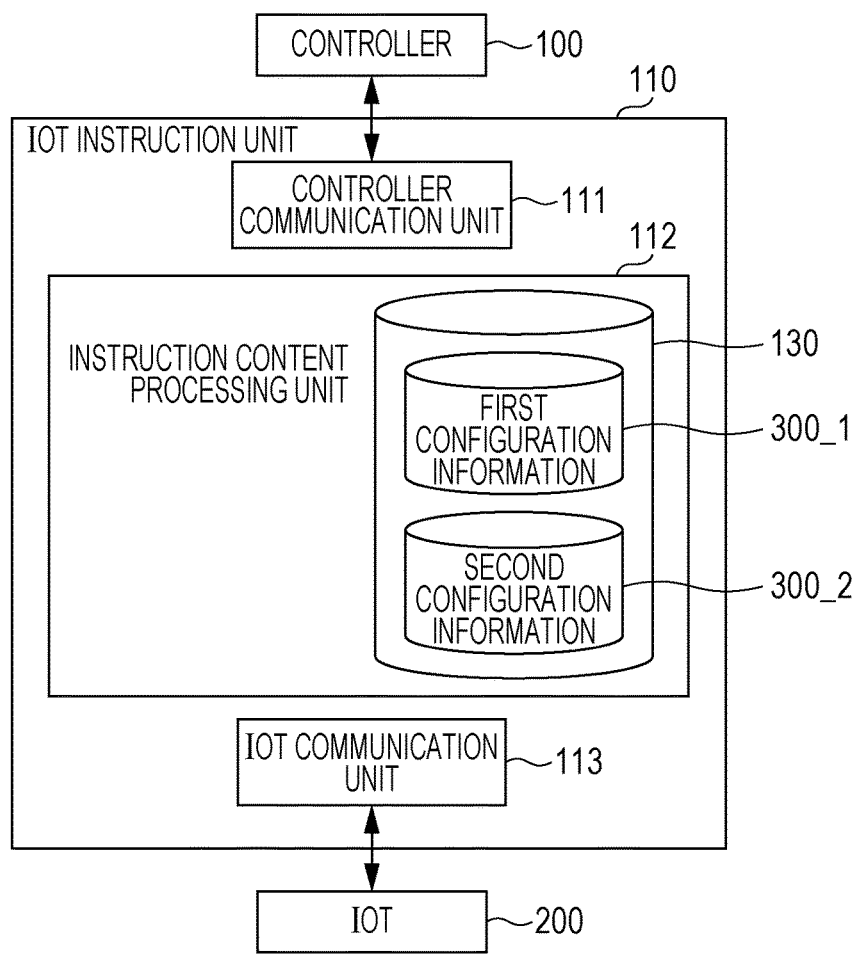
FIG. 4 illustrates the structure of an IOT instruction unit.

FIG. 4 illustrates the structure of the IOT instruction unit 110.

The IOT instruction unit 110 includes a controller communication unit 111 that communicates with (the principal part of) the controller 100, an instruction content processing unit 112 that processes the content of an instruction to the printing mechanism unit 200, and an IOT communication unit 113 that communicates with the printing mechanism unit 200. Further, the configuration storage unit 130 described above is incorporated in the instruction content processing unit 112, and the configuration storage unit 130 stores the first configuration information 300_1 and the second configuration information 300_2 as configuration information. Each of the first configuration information 300_1 and the second configuration information 300_2 has the same structure as that of the configuration information 300 illustrated in FIG. 3. The first configuration information 300_1 is the same configuration information as the configuration information stored in the configuration storage unit 120 of the controller 100, and indicates the actual deployment configuration in the printing system 1 illustrated in FIG. 1. Meanwhile, the second configuration information 300_2 is a copy of the configuration information temporarily stored in the configuration storage unit 250 of the printing mechanism unit 200.

A function of temporarily rewriting the configuration information stored in the configuration storage unit 250 of the printing mechanism unit 200 by using the IOT instruction unit 110 having the above structure will be described below with reference to FIG. 4 and a flowchart.

FIG. 5 is a flowchart illustrating a function of temporarily rewriting configuration information.

This function is started when the controller 100 designates an operation instruction for the IOT instruction unit 110 via the controller communication unit 111. First, in step S101, the instruction content processing unit 112 receives the designated operation instruction. Further, the instruction content processing unit 112 reads the first configuration information 300_1 from the configuration storage unit 130 (S102). The instruction content processing unit 112 determines whether the operation instruction received in step S101 is an operation instruction that may be issued to the printing mechanism unit 200 under the deployment configuration indicated by the first configuration information 300_1 (step S103).

If in step S103 the instruction content processing unit 112 determines that the operation instruction may be issued, the process proceeds to step S109. In step S109, the instruction content processing unit 112 outputs the operation instruction to the printing mechanism unit 200, and the printing mechanism unit 200 completes the operation indicated by the instruction.

Meanwhile, if in step S103 the instruction content processing unit 112 determines that the operation instruction may not be issued under the current deployment configuration, the instruction content processing unit 112 reports configuration information indicating the deployment configuration corresponding to the operation instruction to the printing mechanism unit 200, and causes the configuration storage unit 250 of the printing mechanism unit 200 to store the configuration information (step S104). Since the configuration information is reported in this manner, the operation instruction is prevented from being rejected by the printing mechanism unit 200. The operation performed by the instruction content processing unit 112 in step S104 corresponds to an operation performed as an example of a configuration reporting unit of the present invention. Then, when the instruction content processing unit 112 receives a report of completion of storing of the configuration information from the printing mechanism unit 200, the instruction content processing unit 112 causes the configuration storage unit 130 to store the configuration information stored in the printing mechanism unit 200 as the second configuration information 300_2 (step S105).

Then, the instruction content processing unit 112 calculates the current slack amount, and determines whether the operation of the designated operation instruction is executable with the slack amount (step S106). The term "slack amount" as used herein refers to, in the case where, for example, the downstream printer 10B of FIG. 1 is the own apparatus, the amount (excess amount) by which the length of the paper M is greater than the inter-apparatus distance from the other apparatus at the upstream side (that is, the upstream printer 10A) to the own apparatus. Although the portion of the paper of a length corresponding to the slack amount is held in the paper reversing buffer device 20 and therefore there is actually no slack in the paper M, the own apparatus has a greater freedom in operations related to transport of paper as the slack amount increases. The operation performed by the instruction content processing unit 112 in step S106 corresponds to an operation performed as an example of an excess amount calculation unit of the present invention.

If in step S106 the instruction content processing unit 112 determines that the operation of the designated operation instruction is not executable with the current slack amount (that is, determines that the excess amount of the paper M is less than a predetermined amount required for the operation and the paper M might be torn), the instruction content processing unit 112 instructs the other apparatus located upstream of the own apparatus to transport the paper, via the controller communication unit 111 and the controller 100 (step S107). Then, when the instruction content processing unit 112 receives, from the other apparatus at the upstream side, a notification of a change in paper transport status from "stop" to "transport" (step S108), the freedom in operations in the own apparatus at the downstream side is ensured, and therefore the process proceeds to step S109. In step S109, the instruction content processing unit 112 outputs the designated operation instruction to the printing mechanism unit 200, and the printing mechanism unit 200 completes the operation indicated by the instruction. The operation performed by the instruction content processing unit 112 in step S109 corresponds to an operation performed as an example of an instruction output unit of the present invention.

After that, the instruction content processing unit 112 compares the first configuration information 300_1 with the second configuration information 300_2 stored in the configuration storage unit 130 (step S110). When there is a difference, this indicates that the configuration information is temporarily changed in the printing mechanism unit 200, and therefore the process proceeds to step S111. In step S111, the instruction content processing unit 112 reports the same configuration information as the first configuration information 300_1 to the printing mechanism unit 200 so as to restore the configuration information. Then, when the instruction content processing unit 112 receives a report of completion of storing of the configuration information from the printing mechanism unit 200, the instruction content processing unit 112 causes the configuration storage unit 130 to store the configuration information stored in the printing mechanism unit 200 as the second configuration information 300_2 (step S112). As a result, the first configuration information 300_1 and the second configuration information 300_2 become identical to each other, and the function illustrated in the flowchart of FIG. 5 ends.

As described above, even if the operation instruction designated by the controller 100 for the instruction content processing unit 112 is an operation instruction that is rejected by the printing mechanism unit 200, the instruction content processing unit 112 changes the configuration information stored in the printing mechanism unit 200 to avoid rejection, and the printer 10 is caused to execute an instruction from the user (operator) for an operation necessary for maintenance and inspection.

Note that if the function is executed to the end of the flowchart of FIG. 5, the first configuration information 300_1 and the second configuration information 300_2 become identical, so that the configuration information stored in the printing mechanism unit 200 is restored to the configuration information indicating the actual deployment configuration in the printing system 1. However, if the execution is stopped in the middle of the flowchart of FIG. 5 due to an error during the operation or disconnection of power supply, the first configuration information 300_1 and the second configuration information 300_2 may not match each other, and the configuration information stored in the printing mechanism unit 200 may indicate a deployment configuration different from the actual deployment configuration in the printing system 1. This might interfere with normal operations. In view of this, the printer 10 of the present exemplary embodiment sets the configuration information stored in the configuration storage unit 120 of the controller 100 as the first configuration information 300_1 and the second configuration information 300_2 in the configuration storage unit 130 of the IOT instruction unit 110. Further, the printer 10 reports the set second configuration information 300_2 to the printing mechanism unit 200 and stores the second configuration information 300_2 in the configuration storage unit 250. This makes the pieces of configuration information respectively stored in the configuration storage units 120, 130, and 250 match each other, and avoids an operation failure.

Further, if the function illustrated in the flowchart of FIG. 5 is executed unconditionally for all the operation instructions designated by the controller 100, the above-described mechanism for prioritizing safety that is incorporated in the printing mechanism unit 200 is disabled. Accordingly, for example, the function illustrated in the flowchart of FIG. 5 may be executed only for the operation instruction designated for maintenance and inspection via the UI.

Further, the above description illustrates an example in which the upstream printer is instructed to transport paper when the slack amount is not sufficient. However, the instruction unit of the present invention may be one that reports the deployment configuration and outputs an instruction for an operation to the operation unit regardless of the slack amount, or may be one that reports an error and rejects the operation when the slack amount is insufficient.

Further, the above description illustrates a printer that uses so-called continuous paper as a recording medium, as an exemplary embodiment of the image forming apparatus. However, the image forming apparatus of the present invention may be one that uses so-called cut paper as a recording medium.

Further, the above description illustrates a printing system including two printers of the same model. However, the image forming system of the present invention may include three or more image forming apparatuses, or may include plural image forming apparatuses of different models.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
an operation mechanism that transports recording medium and forms an image on the recording medium, the operation mechanism receiving an instruction for an operation and executing the operation;
and a controller configured to operate as an instruction unit that outputs the instruction for the operation to the operation mechanism;
wherein the operation mechanism includes a configuration storage unit that stores deployment configuration of a plurality of image forming apparatuses deployed in an image forming system, the deployment configuration being determined based upon configuration information including a number of image forming apparatuses deployed in the image forming system, an own apparatus position number indicating a position where the image forming apparatus storing the configuration information is deployed in the image forming system, and an other apparatus position number indicating a position where an other apparatus is deployed in the image forming system, and an instruction acceptance unit that, based on a predetermined corresponding relationship between the deployment configuration and operations, accepts an instruction for an operation corresponding to the deployment configuration stored in the configuration storage unit, and rejects an instruction for an operation not corresponding to the deployment configuration; and wherein the instruction unit includes an instruction output unit that receives a designation of an operation to be instructed to the operation mechanism, and outputs an instruction for the designated operation to the operation mechanism, and a configuration reporting unit that, if the operation designated for the instruction output unit is an operation not corresponding to a first deployment configuration stored in the configuration storage unit, reports to the operation mechanism a second deployment configuration to which the designated operation corresponds, and stores the second deployment configuration in the configuration storage unit, before the instruction for the designated operation is output.

2. The image forming apparatus according to claim 1, wherein the configuration reporting unit reports the first deployment configuration to the operation mechanism, and stores the first deployment configuration in the configuration storage unit, after the operation not corresponding to the first deployment configuration is executed by the operation mechanism.

3. The image forming apparatus according to claim 2, wherein the first deployment configuration is a deployment configuration in which a plurality of image forming apparatuses are disposed with the recording medium extending thereacross; and wherein the instruction unit includes a transport instruction unit that, if an instruction for an operation corresponding to the second deployment configuration is output to the operation mechanism by the instruction output unit, causes an upstream image forming apparatus to start transport of the recording medium before the image forming apparatus starts transport of the recording medium, the upstream image forming apparatus being located upstream of the image forming apparatus in a transport path of the recording medium.

4. The image forming apparatus according to claim 3, wherein the instruction unit includes an excess amount calculation unit that calculates an excess amount of the recording medium between the image forming apparatus and the upstream image forming apparatus; and wherein the transport instruction unit causes the upstream image forming apparatus to start transport of the recording medium if the excess amount calculated by the excess amount calculation unit is less than a predetermined level of excess amount.

5. The image forming apparatus according to claim 1, wherein the first deployment configuration is a deployment configuration in which the plurality of image forming apparatuses are disposed with the recording medium extending thereacross; and wherein the instruction unit includes a transport instruction unit that, if an instruction for an operation corresponding to the second deployment configuration is output to the operation mechanism by the instruction output unit, causes an upstream image forming apparatus to start transport of the recording medium before the image forming apparatus starts transport of the recording medium, the upstream image forming apparatus being located upstream of the image forming apparatus in a transport path of the recording medium.

6. The image forming apparatus according to claim 5, wherein the instruction unit includes an excess amount calculation unit that calculates an excess amount of the recording medium between the image forming apparatus and the upstream image forming apparatus; and wherein the transport instruction unit causes the upstream image forming apparatus to start transport of the recording medium if the excess amount calculated by the excess amount calculation unit is less than a predetermined level of excess amount.

* * * * *